(12) United States Patent  
Yee et al.

(10) Patent No.: US 9,169,134 B2  
(45) Date of Patent: Oct. 27, 2015

(54) SEALING ABOUT A QUARTZ TUBE

(71) Applicants: David Kan Yee, West Bloomfield, MI (US); Mark Anthony Quintel, Kalamazoo, MI (US)

(72) Inventors: David Kan Yee, West Bloomfield, MI (US); Mark Anthony Quintel, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 379 days.

(21) Appl. No.: 13/858,390

(22) Filed: Apr. 8, 2013

(65) Prior Publication Data  
US 2014/0299792 A1 Oct. 9, 2014

(51) Int. Cl.  
C02F 1/32 (2006.01)  
G01N 21/64 (2006.01)

(52) U.S. Cl.  
CPC ............ *C02F 1/325* (2013.01); *C02F 2201/004* (2013.01)

(58) Field of Classification Search  
CPC ... C02F 1/325; C02F 2201/326; G01N 21/64; F21V 31/005  
USPC ........... 250/504 R, 461.1, 432 R; 422/22, 24, 422/186, 186.3; 210/748.01, 748.11, 210/748.14  
See application file for complete search history.

(56) References Cited

U.S. PATENT DOCUMENTS 7,642,522 B2 * 1/2010 Egberts .................. 250/429  
2008/0315116 A1 * 12/2008 Schweitzer ............. 250/436

* cited by examiner

*Primary Examiner* — Walter D Griffin  
*Assistant Examiner* — Cameron J Allen  
(74) *Attorney, Agent, or Firm* — Fay Sharpe LLP

(57) ABSTRACT

A sealing arrangement for sealing a quartz tube with a UV lamp therein and electrical cable extending therefrom through the lid of a pressurized fluid purification vessel. In one version, a tubular fitting, threaded on opposite ends, is received over an end of the quartz tube and threadedly engaged in an aperture in the lid and sealed with a first annular seal, a second annular seal in the tubular fitting seals about the quartz tube. A compression nut with an axial extension threadedly engages the opposite end of the tubular fitting and a strain/flexure relief is threaded into the axial extension. In a second version, the second annular seal comprises a flexible sleeve with a member having resilient radially deflectable fingers compressed thereon by a compression nut; and, duplicates of these parts employed to seal about the electrical cable.

12 Claims, 4 Drawing Sheets

SEALING ABOUT A QUARTZ TUBE

BACKGROUND

The present disclosure relates to sealing of a quartz tube containing an electrical device with an electrical lead extending from the tube through the metal wall of a pressurized fluid vessel. Such tubes are employed in fluid purification systems utilizing radiation, such as that emanating from an ultraviolet lamp, within the quartz tube for purification of the fluid. Purification systems employing UV radiation are used in commercial fluid filtration and purification systems where the fluid is to be recycled or used continuously in a process and particularly for water filtration and purification processes.

In systems of the aforesaid type, the pressure vessel may have a removable lid with a plurality of quartz tubes extending therethrough and sealed therein for providing within each of the tubes an ultraviolet lamp for irradiating the fluid in the pressure vessel. In applications where the pressure vessel is of a relatively large volume with a multiplicity of quartz tubes provided through the lid, each with a UV lamp therein, the pressure vessel may be operated with fluid pressures therein in the order of 10 bar (1013 kPa) with fluid temperatures ranging from −60° C. to 105° C. It will be understood that when it is required to remove the lid from the pressure vessel for servicing the contents of the pressure vessel, which may include filters, that it is first required to remove the quartz tubes and UV lamps before the lid is removed from the pressure vessel. Also, it is desirable that the quartz tubes may be removed individually for UV lamp replacement without removing the lid. In such pressure and temperature environments, it has been found difficult to provide a simple, reliably sealing arrangement for sealing the quartz tube in the lid of such a pressure vessel in a manner which provides for easy removal and reassembly. Providing a simple, reliable, readily installable and easily removable technique for sealing of the quartz tube through the metal lid of the pressure vessel has proven difficult in view of the brittleness of the quartz tube with respect to providing the necessary sealing to retain the fluid pressure in the vessel and preventing leakage between the quartz tube and the metal lid. In addition. In the event of breakage of a quartz tube, it is required to maintain the integrity of fluid sealing to prevent fluid escape from the vessel, either around the quartz tube or around the electrical cable. This has proven particularly difficult and complex where extremes of fluid temperatures are encountered. In addition, the electrical leads for the UV lamp extending from the quartz tube require additional securing and flexure strain relief to prevent damage and/or shorting of the electrical leads. Heretofore, this has required a multiplicity of fittings and seals to accomplish the intended result. Thus, it has been desired to provide a simple easily installed and removed and effective way of sealing a quartz tube through the metal wall of a pressure vessel and to provide for securing and strain/flexure relief of the electrical leads extending from the quartz tube.

SUMMARY

The present disclosure describes a simplified sealing arrangement for sealing a quartz tube through a wall of a metal pressure vessel which, in one embodiment, a tubular fitting with threads on the opposite ends thereof has one end engaging threads in the metal wall and employing an annular seal between the metal wall and the fitting. The quartz tube is received in the end of the fitting engaging the metal wall with a second annular seal provided between the quartz tube and the fitting. The end of the fitting opposite the end engaging the metal wall has a compression nut thereover with a flexure/strain relief provided thereon through which is received the electrical cable extending from the quartz tube.

In another embodiment, a tubular fitting threaded at the opposite ends thereof has one threaded end engaging threads in an aperture in the metal wall of the pressure vessel with an annular seal sealing between the fitting and the wall of the pressure vessel with a quartz tube received through the fitting and extending externally of the wall of the pressure vessel. The end of the fitting opposite the threaded end engaging the metal wall has a circumferential array of radially deflectable tabs or fingers thereon with a second resilient annular seal received over the quartz tube and disposed radially inwardly of the fingers. A compression nut engages the threads of the fitting adjacent the fingers and the fingers are compressed radially inwardly onto the second annular seal effecting a seal thereon about the quartz tube. The electrical cable extending from the quartz tube has a similar or duplicate double ended threaded fitting received over the quartz tube spaced from the first fitting with a compression nut sealing a circumferential array of fingers on one end thereof about a third annular seal; and, the opposite threaded end of the fitting is engaged by a flexure/strain relief received over the cable.

The present disclosure thus describes a simple easily installed and cost effective technique for sealing a quartz tube through the metal wall of the pressure vessel and securing a flexure/strain relief over an electrical cable extending outwardly from the tube which cable is attached to an irradiating device within the quartz tube.

DETAILED DESCRIPTION

Figure 1:
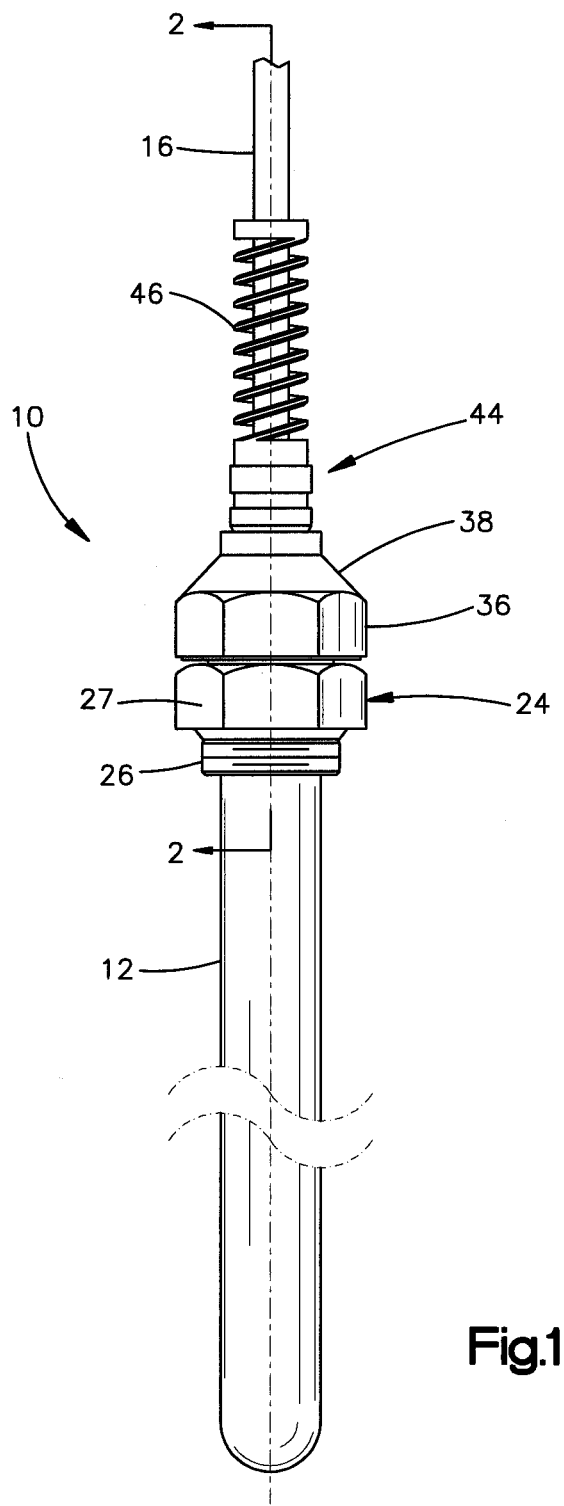
FIG. 1 is an exterior view of a quartz tube having an irradiating device therein with an electrical cable attached thereto and extending outwardly from the quartz tube with a fitting sealed over the quartz tube ready for insertion of the quartz tube through an aperture in the metal wall of the pressure vessel and for threaded engagement therewith.
Figure 2:
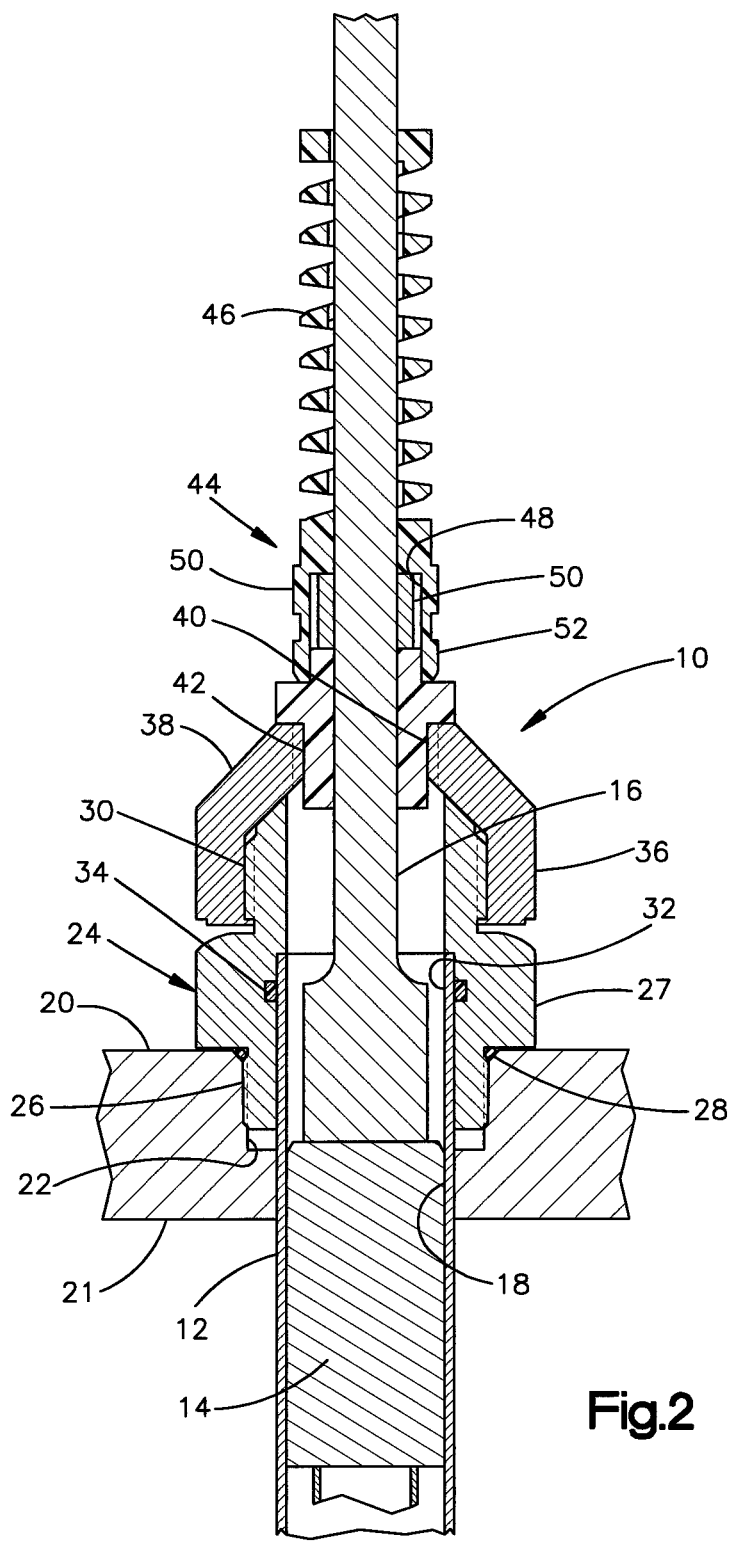
FIG. 2 is an enlarged cross-section taken along section indicating lines 2-2 of FIG. 1 showing the arrangement of FIG. 1 threadedly engaged in the metal wall of a pressure vessel.

Referring to FIGS. 1 and 2, a quartz tube assembly for installation through a metal wall of a pressure vessel is indicated generally at 10 and includes a quart tube 12 having an irradiating device such as a UV lamp 14 encased therein with an electrical cable 16 attached thereto and extending outwardly from the quartz tube 12. It will be understood that the electrical cable 16 includes individual electrical leads (not shown) connected to the UV lamp 14 in a manner well-known in the art. The quartz tube 12 has an open end thereof from which cable 16 extends, received in an aperture 18 formed through the metal wall 20 of a pressure vessel which aperture 18 has a threaded counterbore 22 formed therein.

A tubular fitting indicated generally at 24 has one end 26 thereof provided with threads which may be engaged with the threaded counterbore 22.

Fitting 24 is provided with an outwardly extending flange 27 which in the present practice is provided with a hexagonal periphery for engagement with fitting tool (not shown) for tightening the threads 26 in the counterbore 22. A first annular seal 28 is provided over the threaded end of fitting 24 adjacent the flange 27 and is operative to provide a fluid pressure tight seal between fitting 24 and the threaded counterbore 22. The inner periphery of the fitting 24 is provided with a circumferential groove 32 which has received therein a second annular seal 34 which is operative to seal between the inner periphery of fitting 24 and the outer diameter of the quartz tube 12 to prevent escape of pressurized fluid therebetween. In the present practice, it has been found satisfactory to form the annular seals 28, 34 of elastomeric material. Where the fluid temperatures in the pressure vessel range from −60 to 105° C., it has been found satisfactory to form the annular seals 28, 34 of fluoropolymer elastomeric material.

It will be understood that the lower surface 21 of the metal wall 20 of the pressure vessel is exposed to pressurized fluid; and, the metal wall 20 of the pressure vessel may comprise a removable lid.

A compression nut 36 is received over the threads 30 of the fitting 24 and engaged therewith, the compression nut 36 having a portion 38 thereof extending axially beyond the threads 30 of the fitting 24. The axially extending portion 38 has the inner periphery thereof formed to a reduced diameter from that of the fitting 24 and has internal threads 40 provided therein. The internal threads 40 are engaged by a threaded end 42 of a flexure/strain relief member indicated generally at 44 which is received over the cable 16 in closely fitting arrangement. The flexure/strain relief 44 may have the end thereof remote from compression nut 36 provided with a spiral flexural portion 46. In the version of FIG. 2, flexure/strain relief 44 includes an annular seal 98, a circumferential array of radially deflectable members 50 and a compression nut 52 for effecting a seal about cable 16. The assembly 10 thus provides a simple, relatively low cost arrangement for removably sealing a quartz tube in a metal pressure vessel wall or lid and with a minimum of parts provides for flexural/strain relief of the electrical cable extending from the UV lamp encased in the quartz tube.

Figure 3:
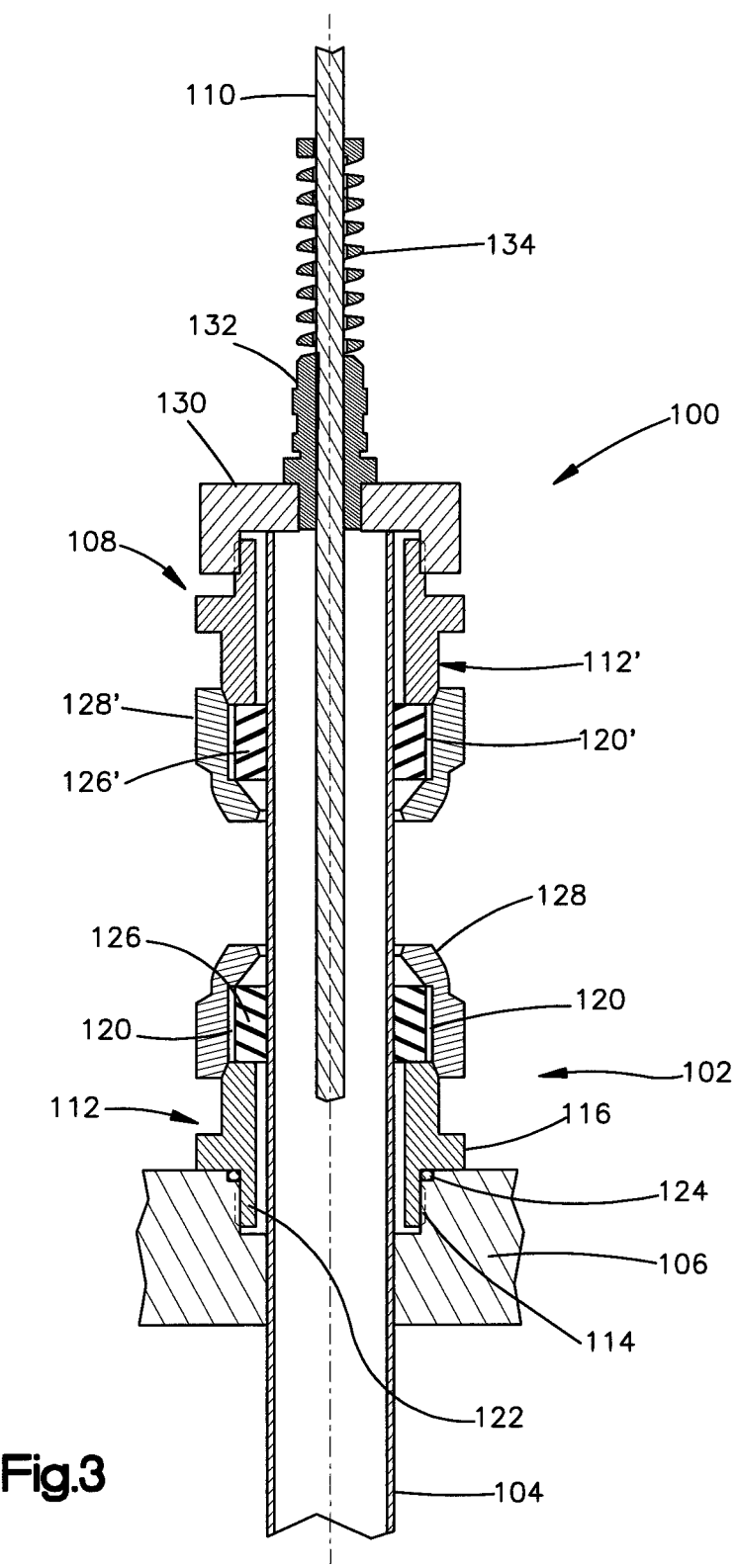
FIG. 3 is a view similar to FIG. 2 of another embodiment of the present disclosure; and, FIG. 4 is an exploded view of a portion of the arrangement of FIG. 3.
Figure 4:
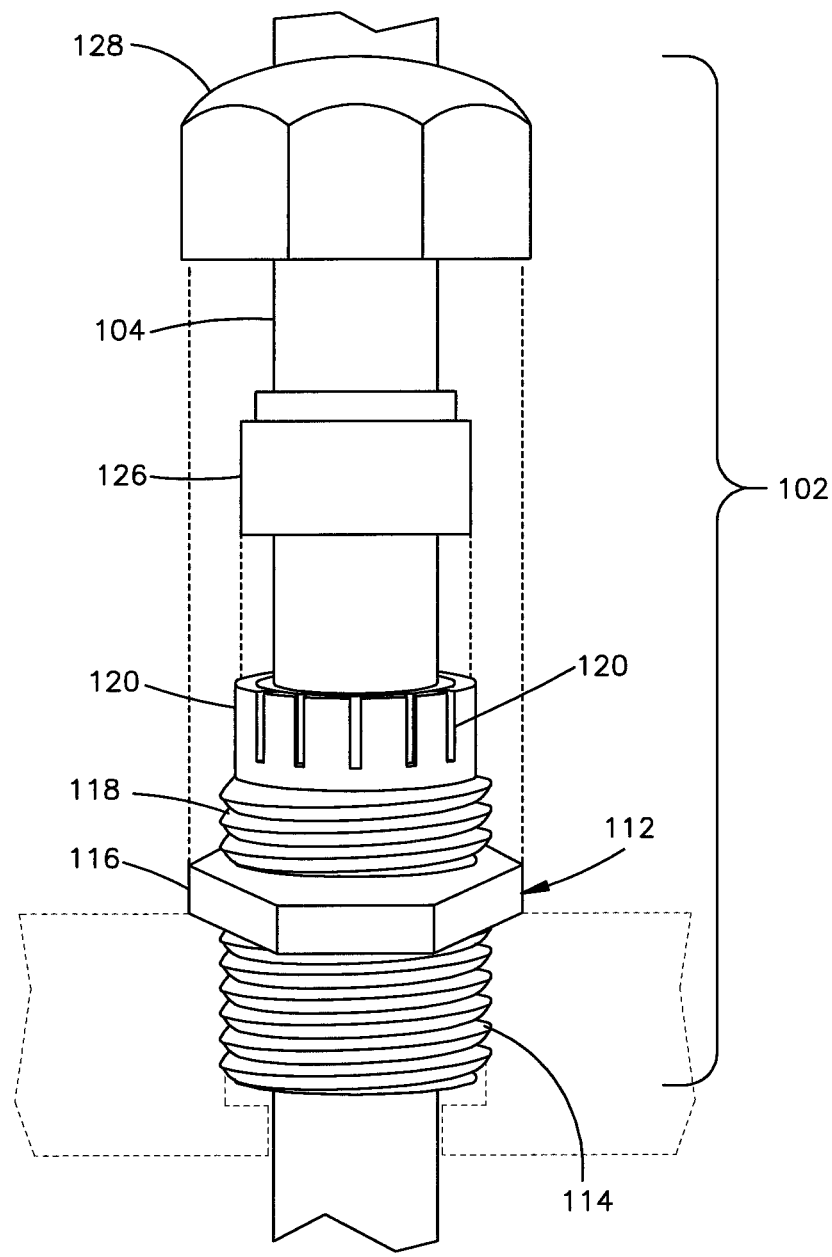

Referring to FIGS. 3 and 4, another version of the disclosure is indicated generally at 100 and includes a sealing arrangement indicated generally at 102 for sealing a quartz tube 104 through a metal wall 106 which may comprise a lid for a pressurized fluid vessel. The assembly 100 includes a separate flexure/strain relief indicated generally at 108 for providing strain relief and flexure protection of an electrical cable 110 extending outwardly from the quartz tube 104, which electrical cable 110 may be connected to a UV lamp (not shown) encased within the quartz tube 104.

The sealing arrangement 102 includes a tubular fitting indicated generally at 112 which has an end thereof provided with threads 114 and an outwardly extending flange 116 provided with peripheral surfaces, such as a hexagon, for engagement by a tightening tool. The end of the tubular fitting 112 on the opposite side of flange 116 from threads 114 has threads 118 provided thereon; and, the fitting 112 has provided thereon a circumferential array of radially inwardly deflectable portions or fingers 120 extending axially beyond threads 118. The fingers 120 may be formed integrally with fitting 112 or on a separate ring.

The threads 114 of fitting 112 may be received in a threaded counterbore 122 provided in the pressure vessel lid 106; and, a first annular seal 124 is provided for sealing the fitting 112 in the lid 106. In the illustrated version 100, the quartz tube 104 extends outwardly of the sealing arrangement 102. A second annular seal member or flexible sleeve is indicated by reference numeral 126 and is received over the quartz tube 104 and nested within the resilient fingers 120. A compression nut 128 is received over the fingers 120 and threadedly engages the threads 118 on fitting 112 causing the fingers 120 to be radially compressed inwardly and effect a seal of the annular member 126 over the outer periphery of the quartz tube 104. In the present practice, seals 124, 126 may be satisfactorily formed of suitable elastomeric material. Where fluid temperatures of −60 to 105° C. are encountered, fluoropolymer elastomer has been found satisfactory.

The sealing arrangement 108 includes a tubular fitting 112', with radially deflectable fingers 120', an annular seal 126' which may be formed of suitable elastomeric material or fluoropolymer elastomeric material for fluid temperatures of −60 to 105° C. and a compression nut 128'. It will be understood that the seal 126', fitting 112' and compression nut 128' may be identical to or duplicates of their numerical counterparts in the seal arrangement 102. In the arrangement 108, a flexure/strain relief nut 130 engages the threads on the upper end of fitting 112'; and, the nut 130 has a flexure/strain relief sleeve 132 which may be threadedly engaged therewith and may have an axially extending portion 134 thereof formed in a spiral configuration for flexure protection. The arrangement 108 thus seals about the outer periphery of the quartz tube 104 by compression of the seal ring 126'. The arrangement 100 thus provides an easy to stall and remove seal for a quartz tube through the metal wall of a pressure vessel and utilizes duplication of parts for sealing the tube through the pressure vessel wall and utilizing duplicate parts for providing a seal of the electrical cable extending therefrom. In the present practice, it has been found satisfactory to form the annular seal members 28, 34, 124, 126, 126' of suitable elastomeric material. In the present practice, it has also been found satisfactory to form the fittings 24, 112, 112' of metal or plastic material and the compression nuts 36, 128, 128' of metal or plastic material. Similarly, the flexure/strain relief members 44 may also be formed of metal or plastic material. In the present practice, flexure/strain relief 132 includes an unshown annular seal, array of radially deflectable members and a compression nut similar to the arrangement of the flexure/strain relief 44 of FIG. 2 and which is operative to effect a seal about the cable 110.

Obviously, modifications and alterations will occur to others upon reading and understanding the preceding detailed description. It is intended that the exemplary versions described herein be construed as including all such modifications and alterations insofar as they come within the scope of the appended claims or the equivalents thereof.

The invention claimed is:

1. In a structure for sealing a UV lamp having an electrical cable and surrounding quartz tube through the wall of a pressurized fluid vessel, the improvement comprising:
    (a) a tubular member formed of quartz material with a UV lamp having an electrical cable extending therethrough;
    (b) a tubular fitting having opposite ends thereof externally threaded and having a radially outwardly extending flange thereon disposed intermediate the opposite threaded ends of the fitting;
    (c) a first annular seal disposed adjacent the flange wherein the external thread of one end of the fitting is engaged in a threaded aperture in the wall of the pressure vessel and the first annular seal is sealed between the flange and an exterior surface of the pressure vessel wall wherein, one end of the quartz tube extends into the tubular fitting;
    (d) an annular groove formed about the inner periphery of tubular fitting;
    (e) a second annular elastomeric seal disposed in the annular groove and sealing about the outer periphery of the quartz tube;

(f) a nut threadedly engaging the end portion of the tubular fitting opposite the one end engaged in the threaded aperture, the nut having an axially extending portion with a central threaded aperture of a diameter less than the threaded engagement, wherein the electrical cable extends exteriorly of the quartz tube and through the central threaded aperture;

(g) a flexure/strain relief member received over the electrical cable and closely interfitting the outer periphery thereof, the flexure/strain relief member including portion thereof engaging the central threaded aperture.

2. The improvement of claim 1, wherein the tubular fitting and the nut are each formed of one of (a) plastic and (b) metal material and the flexure/strain relief member is formed of one of (a) plastic and (b) metal material.

3. The improvement of claim 1, wherein the first and second annular seals are formed of elastomeric material.

4. The improvement of claim 1, wherein the flexure/strain relief member includes a compression sleeve sealing about the periphery of the electrical cable.

5. The improvement of claim 1, wherein the first and second seals are formed of fluoropolymer elastomeric material.

6. In a structure for sealing a UV lamp having an electrical cable and surrounding quartz tube through the wall of a pressurized fluid vessel, the improvement comprising:

(a) a tubular fitting having opposite ends thereof threaded and a radially outwardly extending flange intermediate the threaded opposite ends and a first annular seal disposed over one threaded end adjacent the flange, wherein the one end threadedly engages a correspondingly threaded aperture in the wall of the pressure vessel and is sealed by the first annular seal; and, the quartz tube extends through the tubular fitting and the electrical cable extends through the quartz tube;

(b) a flexible sleeve received over the quartz tube and adjacent the threaded end of the tubular member opposite the one end;

(c) a circumferential array of radially flexible members received over the flexible sleeve;

(d) a compression nut received over the quartz tube and engaging the threaded end of the tubular fitting opposite the one end, wherein the compression nut is operative to compress the array of radially flexible surfaces and flexible sleeve and effect a fluid pressure seal about the periphery of the quartz tube, wherein the electrical cable and quartz tube extend through the compression nut; and, (e) a second tubular fitting received over an end of the quartz tube extending from the compression nut, the secondary tubular fitting including a second flexible sleeve disposed about the periphery of the quartz tube and having one end thereof threaded; and, (f) a flexure/strain relief member received over the electrical cable in closely interfitting arrangement and having portions thereof engaging the one threaded end of the second tubular fitting.

7. The improvement of claim 6, wherein the second tubular fitting includes a circumferential array of radially flexible members and a secondary compression nut.

8. The improvement of claim 6, wherein the flexible sleeve is formed of elastomeric material and the radially flexible members are formed of plastic.

9. The improvement of claim 6, wherein the flexible sleeve is formed of fluoropolymer elastomer.

10. The improvement of claim 6, wherein the radially flexible members are formed integrally as one piece with the tubular member.

11. The improvement of claim 6, wherein the radially flexible members are formed of portions of a ring member.

12. The improvement of claim 6, wherein the flexure/strain relief member includes a seal about the cable.

* * * * *